United States Patent
Park

(10) Patent No.: US 7,627,008 B2
(45) Date of Patent: Dec. 1, 2009

(54) LASER APPARATUS AND METHOD FOR HARMONIC BEAM GENERATION

(76) Inventor: Choong Bum Park, 16443 E. Phillips Dr., Englewood, CO (US) 80112

( * ) Notice: Subject to any disclaimer, the term of this patent is extended or adjusted under 35 U.S.C. 154(b) by 172 days.

(21) Appl. No.: 11/483,996

(22) Filed: Jul. 10, 2006

(65) Prior Publication Data

US 2008/0008215 A1    Jan. 10, 2008

(51) Int. Cl.
*H01S 3/10* (2006.01)
(52) U.S. Cl. .......................................... 372/22; 372/21
(58) Field of Classification Search ............... 385/10; 372/50.22, 20, 96, 22, 38.07
See application file for complete search history.

(56) References Cited

U.S. PATENT DOCUMENTS

| | | | |
|---|---|---|---|
| 3,975,693 A | 8/1976 | Barry et al. | |
| 4,127,827 A | 11/1978 | Barry | |
| 4,413,342 A | 11/1983 | Cohen et al. | |
| 4,637,026 A | 1/1987 | Lin | |
| 5,025,446 A | 6/1991 | Kuizenga | |
| 5,936,983 A | 8/1999 | Yusong et al. | |
| 5,943,351 A | 8/1999 | Zhou et al. | |
| 5,946,330 A * | 8/1999 | Ozygus et al. | 372/19 |
| 6,002,695 A | 12/1999 | Alfrey et al. | |
| 6,047,011 A * | 4/2000 | Cook | 372/22 |
| 6,061,370 A * | 5/2000 | Yin | 372/22 |
| 6,633,594 B1 * | 10/2003 | Kiriyama et al. | 372/22 |

OTHER PUBLICATIONS

W. Koechner, *Solid-State Laser Engineering*, 5th Ed. Springer, 19 pages.

* cited by examiner

*Primary Examiner*—Minsun Harvey
*Assistant Examiner*—Tuan N. Nguyen
(74) *Attorney, Agent, or Firm*—John R. Ley

(57) ABSTRACT

A second harmonic laser beam is generated by passing a fundamental frequency laser beam through a single second harmonic generator (SHG) crystal more than two and preferably four times, to increase the amount of power converted from the fundamental beam into the second harmonic beam and to increase the overall efficiency of the conversion.

21 Claims, 8 Drawing Sheets

LASER APPARATUS AND METHOD FOR HARMONIC BEAM GENERATION

This invention relates to lasers, and more specifically, to a new and improved laser apparatus and method for generating increased quantities of second harmonic laser power from a fundamental frequency laser beam using a single second harmonic generator crystal.

BACKGROUND OF THE INVENTION

Since the scientific discovery of light amplification by stimulated emission of radiation (a "laser"), lasers have found many practical, important, and wide-ranging applications. Lasers produce light at a very narrow spectral range at a singular wavelength and frequency. Laser light therefore differs significantly from ordinary visible light, known as white light, which contains light of a variety of different frequencies and wavelengths. Due to its narrow spectral frequency and fixed wavelength, laser light is typically referred to as monochromatic light. The singular frequency and wavelength characteristic of laser light make it ideal for many different practical applications where ordinary visible light is unsuitable.

The monochromatic light produced by lasers results from a phenomenon of quantum mechanics. A lasing medium is pumped with energy from an external source, and the electrons of the lasing medium are excited to a higher energy state. As the electrons return to the lower state, the energy which placed the electrons in the higher energy state is released through the emission of light. The characteristics of the light emitted are defined by the difference between the excited energy state and the lower energy state, causing light of a specific wavelength and frequency to be emitted. The frequency and wavelength of light are related to each other as a result of their product equaling the speed of light. Because the electron energy states of the lasing medium can not be generally altered, the frequency and wavelength of the laser beam are commonly fixed by the lasing medium.

Laser light having a frequency and wavelength other than the fundamental frequency emitted from the lasing medium might be more desirable for a particular application, but the cost of a laser with a specific type of lasing medium that emits that desired frequency and wavelength might be prohibitive, if such lasing medium was available to generate a fundamental frequency laser beam at the desired frequency.

The advent of harmonic generators have expanded the ability to achieve different wavelengths of laser light from a given lasing medium. A harmonic generator is formed from a crystal whose unit cell lacks a center of inversion. Such a crystal is also known as a nonlinear optical device. As light with a fundamental frequency laser beam passes through the harmonic generator crystal, light at a second harmonic frequency is formed. The second harmonic light is light which has a fundamental frequency two times higher than the fundamental frequency and which has a wavelength which is one half the wavelength of the fundamental frequency laser light. Thus for example, a second harmonic generator crystal can convert fundamental laser light with a wavelength of 1064 nm into light which possesses a wavelength of 532 nm (i.e., green light). Similarly, wavelengths of 355 and 266 nm can be generated from a 1064 nm laser source using third and fourth harmonic generator crystals, respectively.

Prior art techniques for implementing a second harmonic generator involve the use of folded resonator laser apparatus, as shown in FIGS. 1 and 2. A folded L-resonator laser apparatus 20 (FIG. 1) and a folded Z-resonator laser apparatus 22 (FIG. 2) use mirrors 24 and 26 (FIG. 1) and mirrors 28, 30 and 32 (FIG. 2), respectively, to pass a fundamental frequency laser beam 34 originating from a laser 36 through a SHG crystal 38. The fundamental laser beam 34 is passed through the SHG crystal 38 twice. The laser 36 generates the laser beam 34 of an initial fundamental wavelength and fundamental frequency that is reflected off the mirror 24 (FIG. 1) and mirrors 28 and 30 (FIG. 2). In each case, the mirror 24 (FIG. 1) and mirrors 28 and 30 (FIG. 2) are highly reflective of the fundamental laser beam 34, and therefore reflect substantially all of the incident light energy of the fundamental laser beam 34.

The reflected laser beam 34 passes through the SHG crystal 38. As the laser beam emerges from the SHG crystal 38, a certain portion of the fundamental beam 34 has been converted to a second harmonic laser beam 40a which possesses a frequency that has twice the fundamental frequency and half the wavelength of the fundamental beam 34. Not all of the fundamental laser beam 34 is converted into the second harmonic laser beam 40a, so the portion of the fundamental beam 34 that emerges from the SHG crystal 38 is indicated at 34a. The fundamental and second harmonic beams 34a and 40a are next reflected from the mirror 26 (FIG. 1) and mirror 32 (FIG. 2) back through the SHG crystal 38 again. The second pass of the fundamental beam 34a through the SHG crystal 38 again causes some of the energy of the fundamental beam 34a to be converted into the second harmonic beam 40b. The diminished energy of the fundamental beam which emerges from the SHG crystal 38 is represented by the fundamental beam 34b. The second harmonic beam 40b emitted from the SHG crystal 38 after the second pass of the fundamental beam through the SHG crystal has increased in power resulting from the pass of the fundamental beam 34a through the SHG crystal 38.

The fundamental beam 34b and the second harmonic beam 40b advance to the mirror 24 (FIG. 1) and the mirror 28 (FIG. 2). The mirror 24 (FIG. 1) and mirror 28 (FIG. 2) are dichroic mirrors, each with a dielectric coating (not shown) that selectively filters the fundamental frequency beams 34b from the second harmonic beam 40b. The dichroic mirrors 24 (FIG. 1) and 28 (FIG. 2) reflect the fundamental beam 34b back to the lasing medium of the laser 36, where its energy may be used to stimulate more light emission from the laser 36. However, the dichroic mirrors 24 (FIG. 1) and 28 (FIG. 2) pass the second harmonic beam 40b through the mirrors 24 (FIG. 1) and 28 (FIG. 2) without reflection. The second harmonic beam 40b is emitted from the laser apparatus 20 (FIG. 1) and 22 (FIG. 2) as a second harmonic laser beam 40 which can then be used for an intended purpose. The characteristics of the dielectric coating of the dichroic mirrors are selected to assure reflection and passage of the fundamental and second harmonic frequency laser beams.

By using the folded resonators 20 (FIG. 1) and 22 (FIG. 2), different frequencies of laser light beams can be obtained even though lasing medium of the laser 36 yields only a single laser beam 34 having a single fundamental frequency and a single fundamental wavelength. The amount of power of the second harmonic laser beam 40 is determined primarily by the efficiency of conversion of the SHG crystal 38. Limits exist as to the power of the second harmonic beam 40 that can be generated by the SHG crystal 38.

Increasing the intensity or power of the fundamental frequency laser beam 34 is one possible way to increase the power of the second harmonic beam 40, because more second harmonic energy will be converted from the higher energy fundamental frequency laser beam. Such an approach, however, has limited applicability because of physical limitations of the SHG crystal. The efficiency of conversion of the fundamental beam to the second harmonic beam is related to the square of the physical length of the SHG crystal through which the beam propagates. Increasing the length of the crystal increases the efficiency of conversion of the fundamental beam into the second harmonic beam. However, once the SHG crystal exceeds a specific but somewhat unpredictable length, further increasing the length of the SHG crystal will not lead to a further increase in the power of the second harmonic beam generated. Increasing the power of the fundamental beam above a certain power level will damage the SHG crystal through chemical decomposition of some of its constituents.

One technique of obtaining increased second harmonic power without damaging the SHG crystal is to use a two crystal resonator laser apparatus 42 shown in FIG. 3. The two crystal resonator laser apparatus 42 increases the power of the second harmonic beam by placing one SHG crystal 38a in series with a second SHG crystal 38b, and thereby causing the fundamental frequency laser beam to pass four times through the two SHG crystals 38a and 38b. Other than the use of the two series oriented SHG crystals 38, the two crystal resonator laser apparatus 42 is essentially similar to the folded resonator laser apparatus 20 (FIG. 1). The two SHG crystals 38a and 38b are aligned between the mirrors 24 and 26. Upon the fundamental laser beam 34 passing first through the SHG crystal 38a, the fundamental beam 34a emerges as a reduced power fundamental beam 34a and a second harmonic beam 40a is created. The beams 34a and 40a then pass through the second SHG crystal 38b, resulting in a reduced power fundamental beam 34b and an increased power second harmonic beam 40b. The beams 34b and 40b are reflected from the mirror 26 back through the second SHG crystal 38b. The emerging fundamental beam 34c has reduced power and the emerging second harmonic beam 40c has increased power. The beams 34c and 40c pass through the first SHG crystal 38a, and the fundamental beam 34d emerges with even less power while the second harmonic beam 40d emerges with even greater power.

The beams 34d and 40d impinge upon the dichroic mirror 24. The fundamental beam 34d is reflected back to the lasing medium of the laser 36, and the second harmonic beam 40d is emitted as the beam 40. Since the fundamental beam passes through the two SHG crystals 38a and 38b four times, more of the fundamental beam energy is converted into the second harmonic beam 40. While more second harmonic energy is obtained, using the two SHG crystals 38a and 38b in the laser apparatus 42 suffers from the difficulty of requiring a high level of optical precision to align and phase match the second harmonic beams 40a, 40b, 40c and 40d that are generated. Phase matching is required to obtain the increased second harmonic power, because any mismatch in phase results in a power reduction. The fundamental beam and the second harmonic beam become phase mismatched (and obtain different phase velocities) when they experience different indices of refraction as they propagate through the SHG crystals.

A technique known as critical phase matching takes advantage of the birefringent properties of SHG crystals to orient the SHG crystals with respect to the angle at which the fundamental beam impinges on the crystal. With the correct angle of impingement, the fundamental and second harmonic beams have the same indices of refraction and hence the same phase velocities, thereby achieving phase matching. Critical phase matching, however, suffers from the extreme precision required to successfully orient the crystal. For some SHG crystals, the efficiency at which the power of the fundamental beam is converted to the second harmonic beam can be reduced by as much as 50% if the crystal is misaligned by only 1-3 mrad (0.06-0.17°). Accordingly, if the two crystals are slightly misaligned, the benefits of the multiple pass are substantially diminished. Furthermore, any misalignment of one SHG crystal compounds the misalignment of the second SHG crystal.

Critical phase matching may also be achieved by heating the SHG crystals to elevated temperatures. While heating to achieve phase matching may be acceptable under some circumstances, such as in the laboratory or in some highly controllable industrial or manufacturing processes, heating may be inappropriate in other situations, such as in consumer products.

SUMMARY OF THE INVENTION

The present invention increases the amount of power of a second harmonic laser beam which is generated from a fundamental laser beam, without increasing the amount of power of the fundamental laser beam and without requiring the use of precision and tedious alignment techniques required to pass the fundamental beam through multiple SHG crystals. The present invention also increases the overall efficiency at which the power from the fundamental laser beam is converted into the second harmonic laser beam. These beneficial advantages and improvements are achieved by the use of a single SHG crystal.

In accordance with these and other features, one aspect of the invention involves a laser apparatus which comprises a second harmonic generator (SHG) crystal which converts a beam of light energy at the fundamental frequency into a beam of light energy at the second harmonic frequency with each pass of a fundamental frequency beam through the SHG crystal. An optical transmission element propagates the fundamental beam through the SHG crystal in more than two optical passes and transmits the second harmonic beam resulting from each pass in an optical path. A dichroic device within the optical path diverts the second harmonic beam from the fundamental beam.

Further aspects of the laser apparatus involve propagating the fundamental beam through the SHG crystal at least four times. The optical transmission element may comprise a plurality of mirrors positioned to reflect the fundamental beam through the SHG crystal at least four times to generate and increase the power of the second harmonic beam with each pass through the SHG crystal. The dichroic device may comprise a dichroic mirror. The other aspects of the optical transmission element may include a plurality of mirrors. A laser generates the fundamental beam.

Another aspect of the invention involves a method for generating a second harmonic laser beam from a fundamental laser beam. The method involves generating the second harmonic beam by passing the fundamental beam through a SHG crystal to convert light energy at the fundamental frequency into light energy at the second harmonic frequency with each pass of the fundamental beam through the SHG crystal, increasing the power of the second harmonic beam above the power of the second harmonic beam from the previous pass with each additional pass through the SHG crystal, and passing the fundamental beam through the SHG crystal in more than two pass.

Further aspects of the method involve filtering the second harmonic beam from the fundamental beam, passing the fundamental beam through the SHG crystal in at least four passes before filtering the fundamental beam from the second harmonic beam, using mirrors to pass the fundamental beam through the SHG crystal in the four passes, using a dichroic mirror to filter the fundamental beam from the second harmonic beam, generating the fundamental beam from a laser, or diverting the fundamental beam remaining after the passes through the SHG crystal to the laser beam.

An additional aspect of the invention includes producing third and fourth harmonic laser beams, as well as further odd and even higher harmonic laser beams, using the fundamental and second harmonic beams generated. The third and fourth harmonic laser beams are generated through the addition of a third harmonic generator crystal and fourth harmonic generator crystal, respectively. The third and fourth harmonic laser beams produced are filtered from the other laser beams using dichroic mirrors.

A more complete appreciation of the present disclosure and its scope, and the manner in which it achieves the above and other improvements, can be obtained by reference to the following detailed description of presently preferred embodiments taken in connection with the accompanying drawings, which are briefly summarized below, and the appended claims.

DETAILED DESCRIPTION

Figure 4:
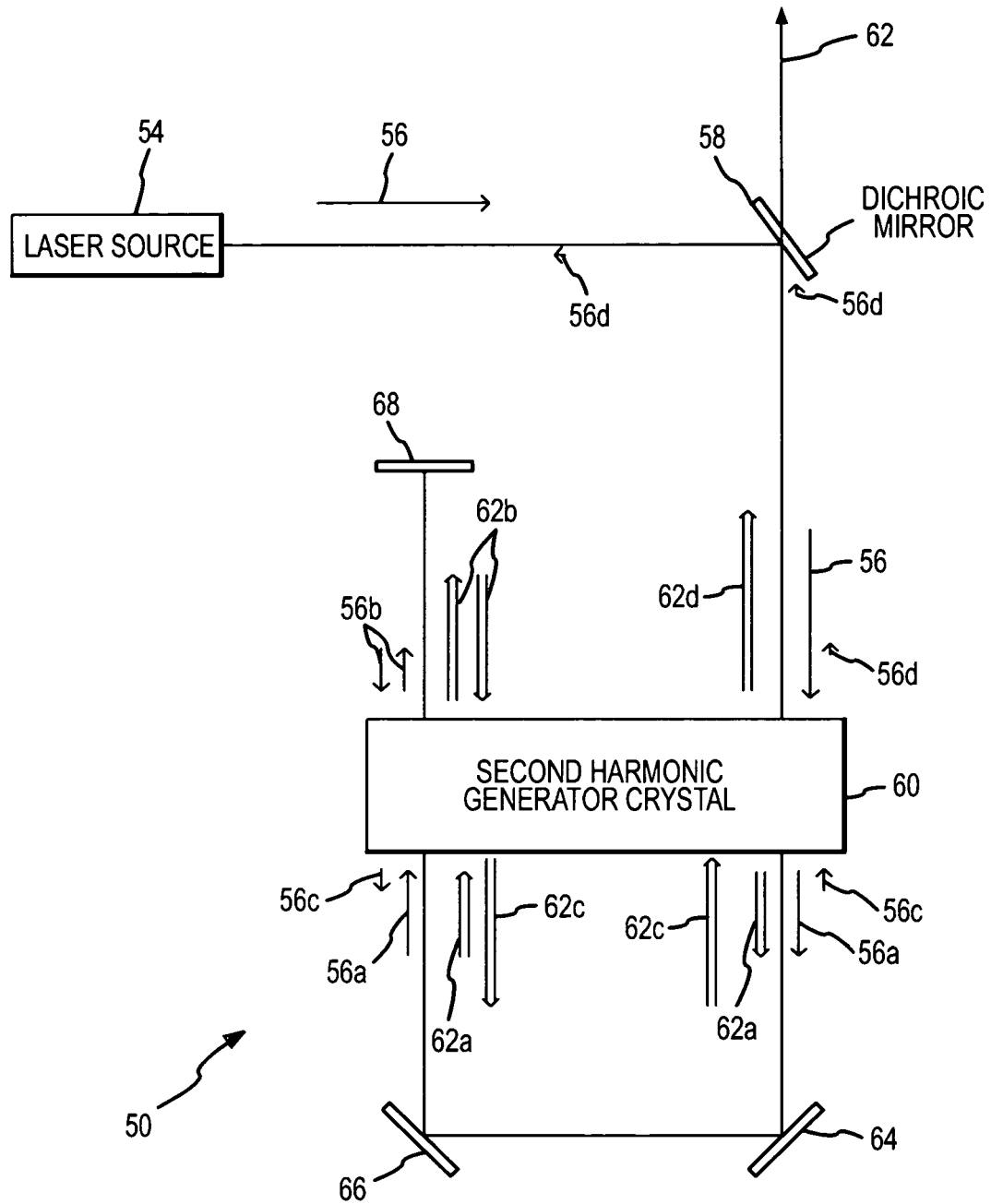
FIG. 4 is a block diagram of a second harmonic generator laser apparatus using a single SHG crystal that incorporates the present invention.

A second harmonic generator 50 in which the present invention is incorporated is shown in FIG. 4. The second harmonic generator 50 includes a laser source 54 that generates a continuous or pulsed fundamental frequency laser beam 56. A dichroic mirror 58, which is highly reflective of the fundamental frequency of the laser beam 56, reflects the fundamental beam 56 onto a single second harmonic generator (SHG) crystal 60.

The fundamental beam 56 passes through the SHG crystal 60, and emerges as a fundamental beam 56a of reduced power compared to the incident fundamental beam 56, because the SHG crystal 60 creates a second harmonic beam 62a from some of the power of the fundamental beam 56 during a first pass of the fundamental beam through the SHG crystal 60. The second harmonic beam created by the SHG crystal 60 has a frequency twice the frequency of the fundamental beam 56 and a wavelength of one half the wavelength of the fundamental beam 56. The SHG crystal 60 has the inherent property of converting some portion but not all of the energy of the fundamental frequency beam into the second harmonic beam.

Mirrors 64 and 66 reflect the beams 56a and 62a through the SHG crystal 60 again, thereby directing the fundamental beam 56a in a second pass through the SHG crystal 60. Again some of the energy of the fundamental beam 56a is converted into additional power of the second harmonic beam, resulting in diminished power of the fundamental beam 56b and increased power of the second harmonic beam 62b which emerge from the SHG crystal 60 as a result of the second pass.

A third mirror 68 reflects the beams 56b and 62b back through the SHG crystal 60 in a third pass. The third pass further decreases the energy of the fundamental beam 56c and further increases the energy of the second harmonic beam 62c, emerging from the SHG crystal 60 after the third pass.

The mirrors 66 and 64 reflect the beams 56c and 62c through the SHG crystal 60 in a fourth pass. Once again, the energy of the fundamental beam 56c is reduced and the energy of the second harmonic beam 62c is increased resulting in the emergence of the fundamental beam 56d and the second harmonic beam 62d after the fourth pass through the SHG crystal 60.

The fundamental beam 56d and the second harmonic beam 62d impinge on the dichroic mirror 58. The dichroic mirror 58 is highly reflective of light at the fundamental frequency, and therefore reflects the fundamental beam 56d back into the lasing medium (not shown) of the laser source 54. The reflected fundamental beam 56d assists in maintaining the laser energy output of the fundamental beam 56 from the laser source 54. The dichroic mirror 58 is highly transmissive of light at the second harmonic frequency, and therefore passes the second harmonic beam 62d out of the second harmonic generator 50 as an emitted second harmonic beam 62. The emitted second harmonic beam 62 may thereafter be applied in some practical application.

By passing the fundamental frequency beam 56 through the single SHG crystal 60 four times or in four passes, a larger amount of the energy of the fundamental beam 56 is converted into the second harmonic beam 62, thereby increasing the energy output of the second harmonic beam 62 without increasing the energy output from the laser source 54 and without using multiple SHG crystals which require precise alignment. More details concerning the components of the second harmonic generator 50 are described as follows.

The laser source 54 is conventional. The laser source 54 includes a lasing medium (not shown) formed from material that is capable of producing the fundamental laser beam 56. Crystals capable performing as a lasing medium include Nd:YAG (neodymium doped yttrium aluminum garnet), Nd:YVO$_4$ (neodymium doped yttrium orthovanadate) and Nd:YLF (neodymium doped yttrium lithium fluoride), among others. The lasing medium generates the fundamental beam 56 from energy delivered from a conventional laser pump (also not shown), such as a lamp, a laser diode, or another laser. The laser source 54 also includes a reflecting mirror (not shown) which allows repetitive reflections of radiation within the lasing medium to generate the fundamental beam 56. The laser source 54 may optionally include a conventional Q-switch or mode locker (neither shown) to shutter or pulse continuous wave light energy and thereby achieve a pulsed fundamental frequency beam 56.

The dichroic mirror 58 is also conventional and is formed by a dielectric coating which is highly reflective of light at the frequency of the fundamental beam 56 and which is highly transparent to light at the second harmonic frequency of the fundamental beam 56.

The SHG crystal 60 may be any known nonlinear optical crystal capable of producing a second harmonic beam from light in energy which impinges on the crystal. Examples of a suitable SHG crystal 60 include KDP (potassium dihydrogen phosphate), KD*P (potassium dideuterium phosphate), ADP (ammonium dihydrogen phosphate), CDA (cesium dihydrogen phosphate), $LiNbO_3$ (lithium niobate), $LiIO_3$ (lithium iodate), $Ba_2NaNB_5O_{15}$ (barium sodium niobium oxide), KTP (potassium titanyl phosphate), BBO (beta borium barate), and LBO (lithium triborate). The SHG crystal 60 is preferably either a KTP or LBO crystal.

The mirrors 58, 64, 66, and 68 are arranged in planes to reflect (or reflect and transmit in the case of the dichroic mirror 58) the beams 56, 56a, 56b, 56c, 56d, 62a, 62b, 62c, 62c and 62d at angles of incidence (or reflection) of 0° or 45°. Consequently, the mirrors 58, 64, 66 and 68 are examples of optical light transmission elements which cooperatively form a light transmission path which directs the fundamental beam from the laser source 54 and passes it in four parallel paths through the single SHG crystal 60, as shown in FIG. 4.

The optical light transmission elements formed by the mirrors 58, 64, 66 and 68 conduct the second harmonic light beam coincidentally with the fundamental beam along a single optical axis, as shown by the solid lines in the Figures. The arrows representing the fundamental and second harmonic light beams are shown separately and to the side of the single optical path to illustrate the effects occurring when the fundamental beam passes through the SHG crystal. The parallel paths of the fundamental and second harmonic laser beams diverge from one another when the fundamental and second laser beams pass through the dichroic mirror, thereby allowing the second harmonic beam to emerge from the laser apparatus 50.

The mirrors 58, 64, 66 and 68 are highly efficient in their reflection of the impinging light energy. Consequently, a very small proportion of the incident energy is lost as a result of reflection. Similarly, the dichroic mirror 58 is highly efficient in its transmission of the second harmonic light energy. Consequently, only a very small portion of the second harmonic light energy generated by passing the fundamental beam through the SHG crystal is lost as they second harmonic beam emerges from the laser apparatus.

Figure 5:
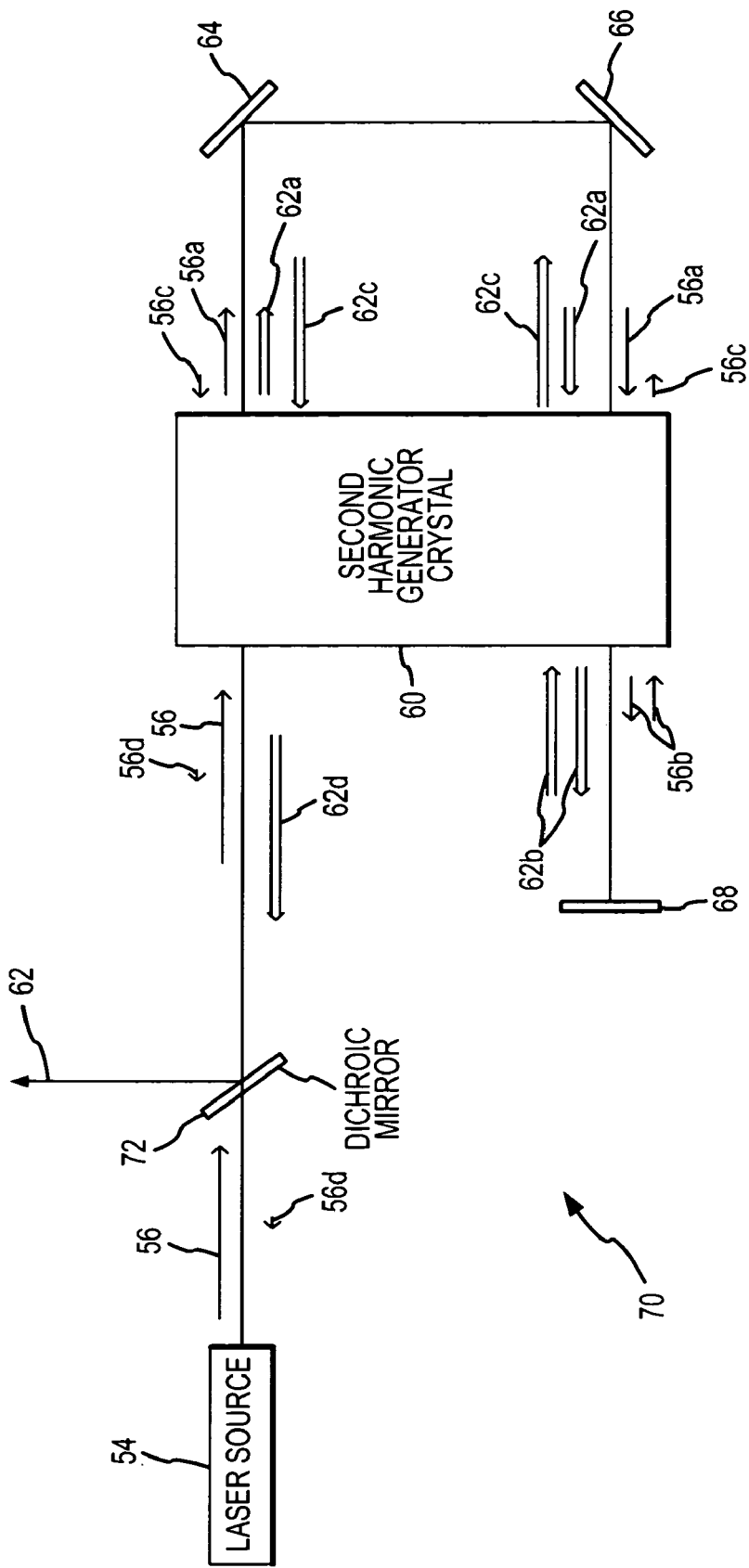
FIG. 5 is a block diagram of another form of a second harmonic generator laser apparatus using a single SHG crystal that also incorporates the present invention.

A different second harmonic generator laser apparatus 70, which also incorporates the present invention, is shown in FIG. 5. The laser apparatus 70 is similar to the second harmonic generator laser apparatus 50 (FIG. 4), except that a dichroic mirror 72 is modified to transmit the fundamental beams 56 and 56d while reflecting the second harmonic beam 62d as the second harmonic beam 62 delivered from the laser apparatus 70. In all other respects, the second harmonic generator laser apparatus 70 is similar in function to the second harmonic generator laser apparatus 50 (FIG. 4).

The second harmonic generators 50 and 70 can be implemented in either an external or internal configuration. The external configuration uses a self-contained laser beam generator as the laser source 54. The lasing medium and the mirrors at opposite ends of the light path through the lasing medium are contained within the laser source 54, in the conventional manner. The mirrors 58, 64, 66 and 68 and the SHG crystal 60 are positioned outside of the self-contained laser source 54. The internal configuration is formed when the mirrors 58, 64, 66 and 68, the SHG crystal 60, the lasing medium and the reflective mirrors at the ends of the light path through the lasing medium are all contained as the resonator cavity, and only the second harmonic beam 62 emerges from this internal configuration resonator cavity laser.

Figure 6:
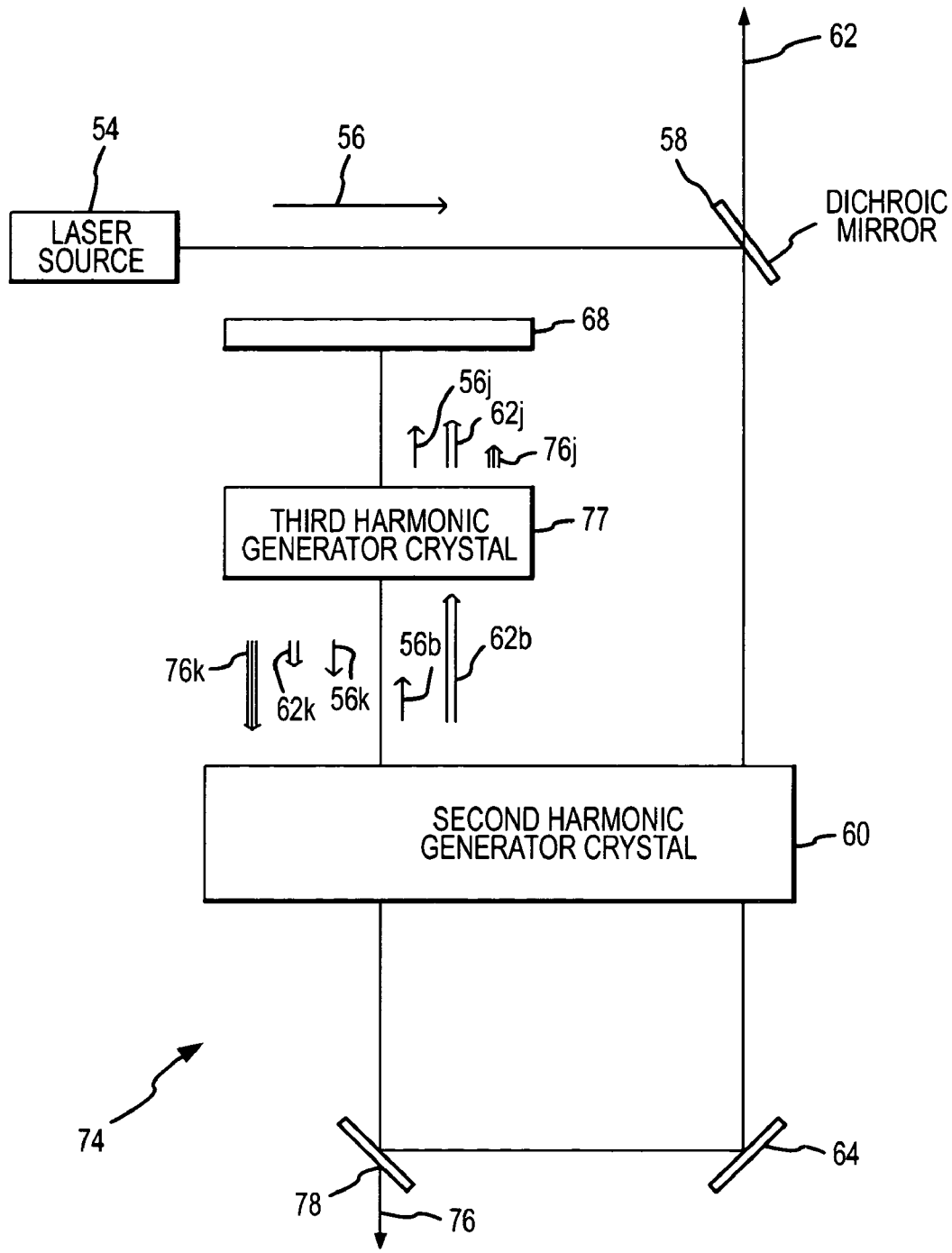
FIG. 6 is a block diagram of a third harmonic generator laser apparatus, which is similar to the second harmonic generator laser apparatus shown in FIG. 4, but which also includes a third harmonic generator crystal to produce a third harmonic beam.

Either second harmonic generator laser apparatus 50 (FIG. 4) or 70 (FIG. 5) can be modified to create a third harmonic generator 74 which can create a third harmonic beam 76, as illustrated by FIG. 6. The third harmonic generator 74 uses a conventional third harmonic generator (THG) crystal 77 placed in the optical path between the second harmonic generator crystal 60 and the mirror 68. Upon the fundamental beam 56b and a second harmonic beam 62b emerging from the SHG crystal 60, they enter the THG crystal 77 to form the third harmonic beam 76j. The third harmonic beam 76j, the second harmonic beam 62j, and a fundamental beam 56j emerge from the third harmonic generator crystal 77, whereupon they are reflected off of the mirror 68 and re-enter the THG crystal 77 in a second pass through that crystal 77. The THG crystal 77 converts the beams 56j and 62j to more third harmonic power which is added to the third harmonic beam 76j to create a more powerful third harmonic beam 76k. The third harmonic beam 76k and fundamental beam 56k and second harmonic beam 62k emerge from the THG crystal 77.

At this point, the third harmonic beam 76k is filtered from the fundamental and second harmonic beams by a dichroic mirror 78 that transmits the third harmonic beam 76k as the delivered or output third harmonic beam 76. The dichroic mirror 78 reflects the fundamental and second harmonic beams 56k and 62k to the mirror 64 and back through the SHG crystal 60 to the dichroic mirror 58 in the same manner as has been discussed previously in conjunction with the second harmonic laser apparatus 50 (FIG. 4). The dichroic mirror 78 is therefore highly reflective of the fundamental and a second harmonic beams but passes the third harmonic beam 76k as the delivered third harmonic beam 76.

Figure 7:
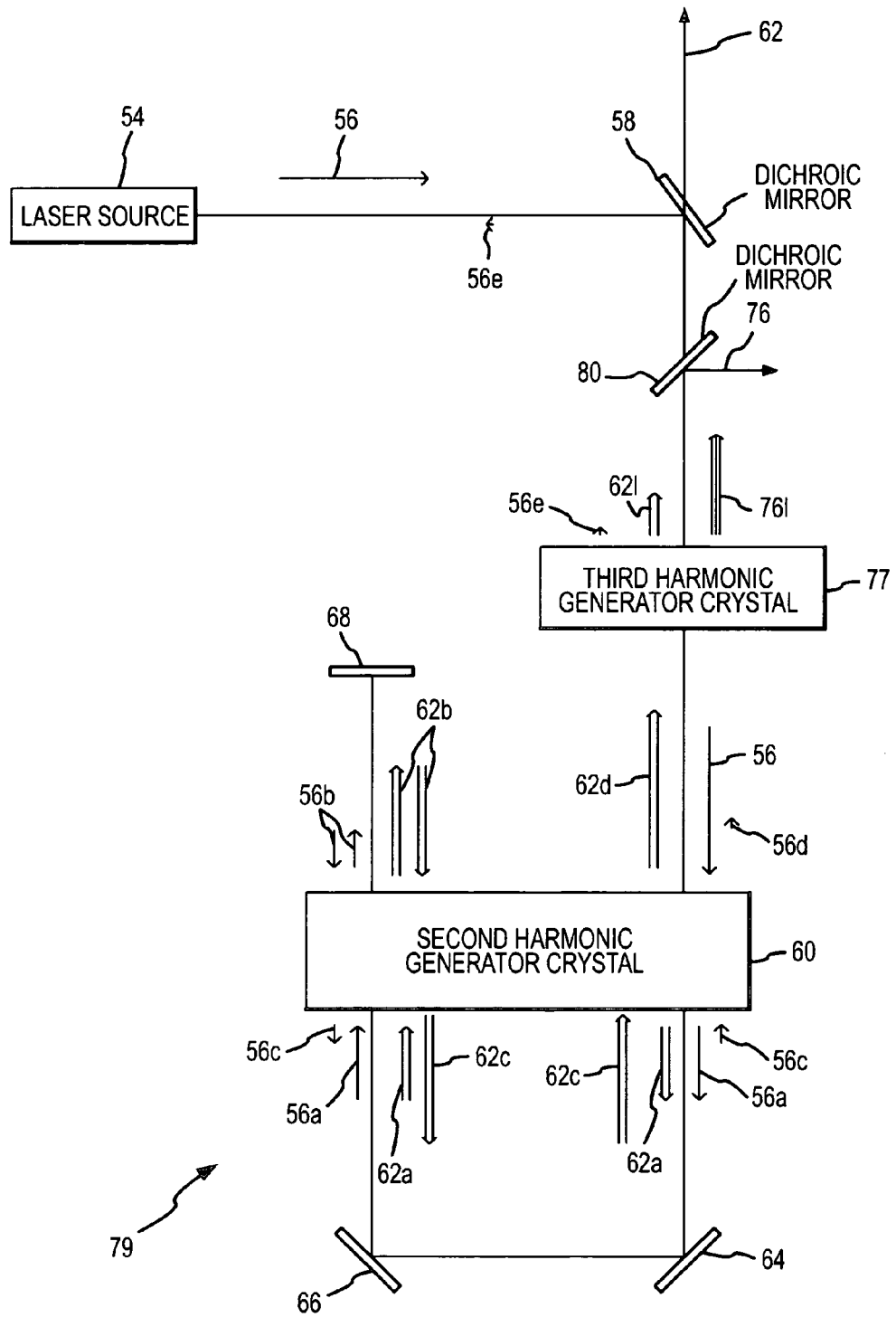
FIG. 7 is a block diagram of another form of a third harmonic generator laser apparatus which is similar to the third harmonic generator laser apparatus shown in FIG. 6, but with a different crystal arrangement.

A different type of third harmonic generator laser apparatus 79 is illustrated in FIG. 7. In the third harmonic generator laser apparatus 79, the third harmonic generator crystal 77 is placed in the optical path to receive the second harmonic beam 62 that has been generated after four passes through the second harmonic generator crystal 60, in the manner previously described in connection with the second harmonic generator laser apparatus 50 (FIG. 4) and 70 (FIG. 5). Oriented in this manner, the second harmonic generator crystal 60 is not located in the optical path to absorb any of the third harmonic beam 76 that might pass through the second harmonic generator crystal 60. The third harmonic generator crystal 77 receives the fundamental beams 56 and 56d and the second harmonic beam 62d. After emerging from the third harmonic generator crystal 77, the third harmonic beam 76l, the second harmonic beam 62l, and the fundamental beam 56e propagate toward a dichroic mirror 80. The dichroic mirror 80 filters the beams by reflecting the third harmonic beam 76l as the delivered third harmonic beam 76 while transmitting the fundamental beams 56 and 56e and the second harmonic beam 62. The dichroic mirror 58 then filters the second harmonic beam 62 from the fundamental beam 56 by transmitting the second harmonic beam 62l as the delivered second harmonic beam 62 while reflecting the fundamental beam 56e back to the lasing medium of the laser source 54.

The two different types of second harmonic generators 50 (FIG. 4) and 70 (FIG. 5) are produced through the changing of the reflection and transmission properties of the dichroic mirrors 58 and 72. Similarly, alternative schemes for filtering the beams 56, 62, and 76 in the third harmonic generator 79 can be achieved by changing the reflection and transmission properties of the dichroic mirrors. For example, the dichroic mirror 80 could transmit the third harmonic beam and reflect the first and second harmonic beams, and the dichroic mirror 58 could transmit the second harmonic beam and reflect the fundamental harmonic beam. Of course in this example, the configuration of the optical path and the mirrors 58 and 80 must be altered to accomplish beam filtering in this manner.

Figure 8:
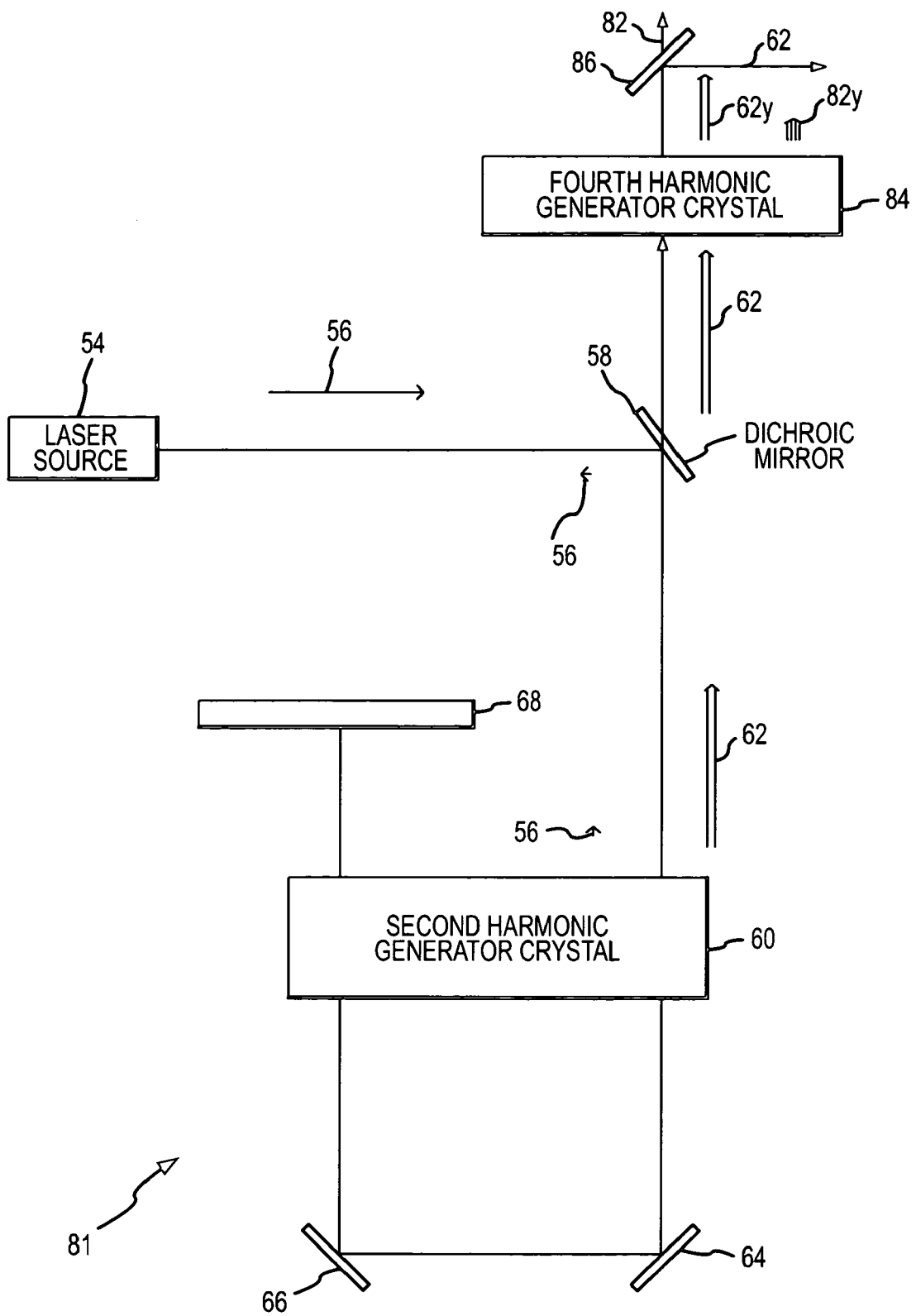
FIG. 8 is a block diagram of a fourth harmonic generator laser apparatus, which is similar to the second harmonic generator laser apparatus shown in FIG. 4, but which also includes a fourth harmonic generator crystal to produce a fourth harmonic beam.

Either second harmonic generator laser apparatus 50 (FIG. 4) or 70 (FIG. 5) can be modified to create a fourth harmonic generator laser apparatus 81 which creates a fourth harmonic beam 82, as illustrated in FIG. 8. After transmission through the dichroic mirror 58, the second harmonic beam 62 enters a fourth harmonic generator (FHG) crystal 84. The FHG crystal 84 converts some of the energy of the second harmonic beam 62 into a fourth harmonic beam 82$y$. The second harmonic beam which emerges from the FHG crystal 84, shown at 62$y$, is reduced in power because some of its power was used to create the fourth harmonic beam 82$y$. The fourth harmonic beam 82$y$ is filtered from the second harmonic beam 62$y$ with an additional dichroic mirror 86. The dichroic mirror 86 is highly reflective of the second harmonic beam 62$y$, and is highly transmissive of the fourth harmonic beam 82$y$. The fourth harmonic beam 82$y$ is transmitted from the fourth harmonic generator laser apparatus 81 as the delivered fourth harmonic beam 82, and the second harmonic beam 62$y$ is also diverted in a separate light path as the delivered second harmonic beam 62.

Although third harmonic generator laser apparatus 74 and 79 (FIGS. 6 and 7) and fourth harmonic generator laser apparatus 81 (FIG. 8) have been specifically described and shown, even higher order harmonic generator laser apparatus are created in a similar manner. In general, odd harmonic generator laser apparatus require the fundamental and the second harmonic beams to create the odd harmonic beam, while even harmonic generator laser apparatus require only only the second harmonic beam to produce even harmonic laser beams.

Figure 1:
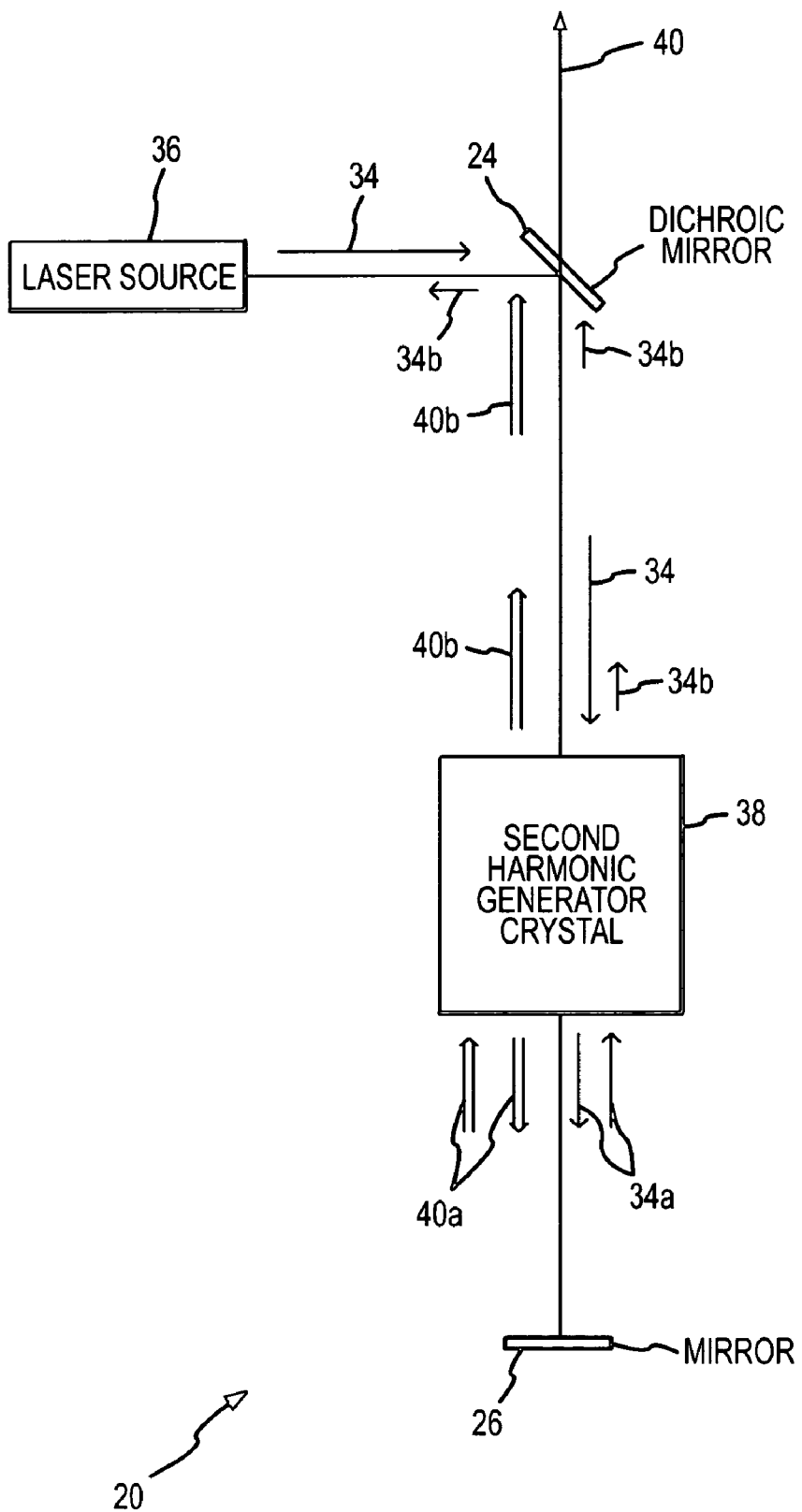
FIG. 1 is block diagram of a prior art folded L-resonator laser apparatus for generating second harmonic energy from a fundamental frequency laser beam.
Figure 2:
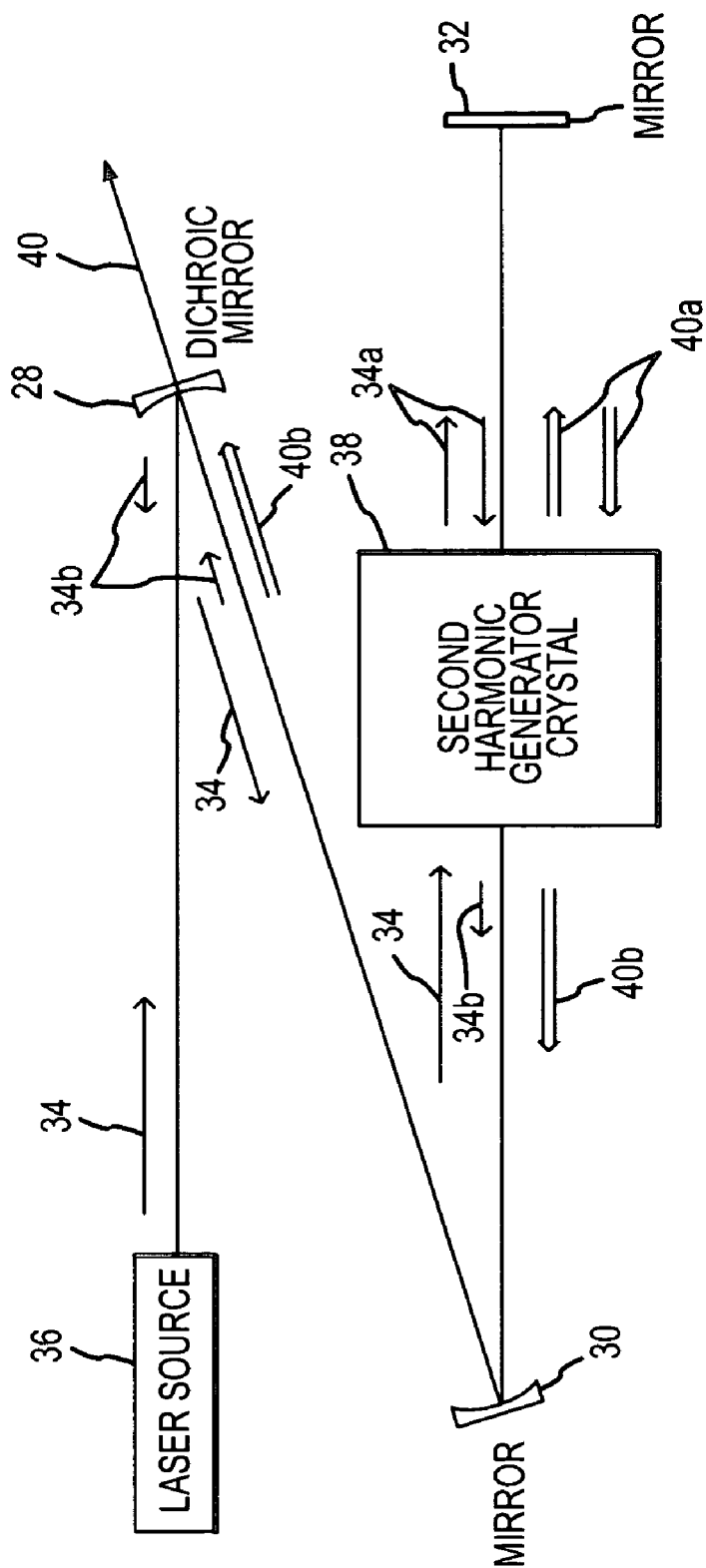
FIG. 2 is block diagram of a prior art folded Z-resonator laser apparatus for generating second harmonic energy from a fundamental frequency laser beam.
Figure 3:
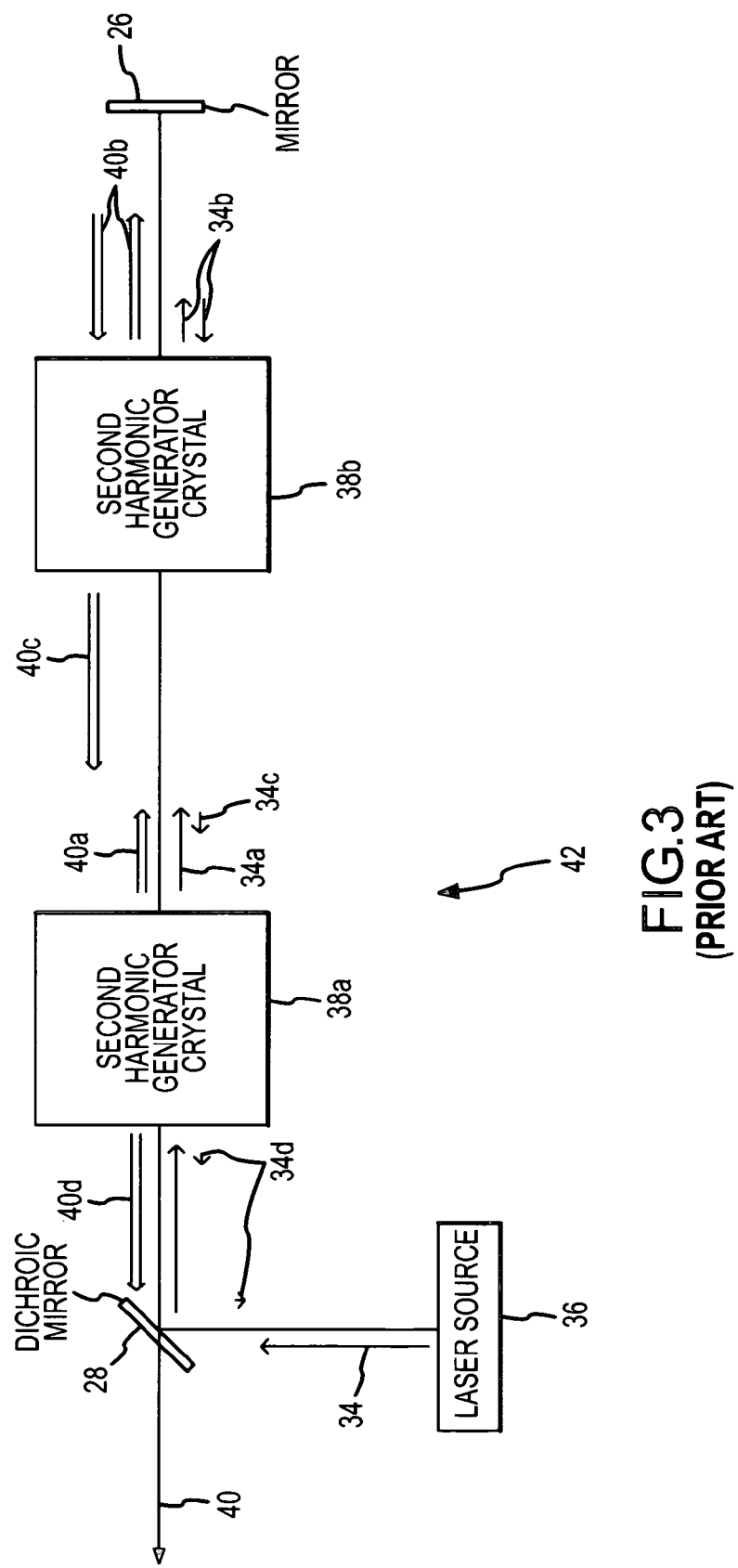
FIG. 3 is a block diagram of a prior art two-crystal resonator laser apparatus for generating second harmonic energy from a fundamental frequency laser beam.

Either second harmonic generator laser apparatus 50 (FIG. 4) or 70 (FIG. 5) can generate a higher power, second harmonic beam 62 for a given power of the fundamental frequency laser beam 56 emitted from the laser source 54, compared to the prior art second harmonic generator laser apparatus 20, 22 and 42 shown in FIGS. 1, 2 and 3, respectively. In the L- and Z-folded resonator apparatus 20 (FIG. 1) and 22 (FIG. 2), the fundamental beam 34 passes through a SHG crystal 38 only two times. With each pass, a percentage of the power of the fundamental beam 56 is converted to the second harmonic beam 40. For instance, if the fundamental beam 34 has an initial power of 100 W and each pass converts 30% of the fundamental beam to the second harmonic beam, the power of the second harmonic beam generated is 51 W.

In contrast, the four-pass second harmonic generator laser apparatus 50 (FIG. 4) or 70 (FIG. 5) converts approximately 76% of the energy of the fundamental beam 56 into the energy of the second harmonic beam 62, in the same circumstance were the SHG crystal 60 converts 30% of the fundamental beam energy into the second harmonic beam energy. Considerably greater energy conversion efficiency is obtained by directing the fundamental beam through the same crystal more than two times and without requiring the use of multiple SHG crystals and the precise alignment of those multiple SHG crystals. These comparative calculations conceptually underscore how second harmonic beams of increased power can be generated without increasing the power output of the fundamental beam from the laser, and without risking damage to the SHG crystal.

Neither second harmonic generator laser apparatus 50 (FIG. 4) or 70 (FIG. 5) requires any more special alignment than is needed by the L- and Z-folded resonator laser apparatus 20 (FIG. 1) and 22 (FIG. 2), and certainly does not require a high level of precision alignment and orientation required by the two crystal laser resonator laser apparatus 42 (FIG. 3). Passing the fundamental beam through the single SHG crystal avoids the difficulties of optical alignment and phase matching that would be required with the use of multiple SHG crystals. For example, green light at a wavelength of 532 nm can be generated at a power that exceeds 100 W from a from a Nd:YAG laser which produces a laser beam at a fundamental wavelength of 1064 nm at a power which will not damage the SHG crystal. Obtaining a power output of greater than 100 W at a wavelength of 532 nm has many practical applications that have been previously unattainable in a convenient, straightforward and cost-effective manner.

The significance of these and other improvements and advantages will become apparent upon gaining a full appreciation of the ramifications and improvements of the present invention. Preferred embodiments of the invention and many of its improvements have been described with a degree of particularity. The description is of preferred examples of implementing the invention, and the description is not necessarily intended to limit the scope of the invention. The scope of the invention is defined by the following claims.

The invention claimed:

1. A laser apparatus for generating a second harmonic laser beam at a second harmonic frequency of a fundamental frequency of a fundamental frequency laser beam, for use with a laser source that generates the fundamental laser beam at the fundamental frequency, the laser apparatus comprising:

a second harmonic generator (SHG) crystal receptive of the fundamental beam which converts a portion of the light energy of the fundamental beam into a second harmonic beam of light energy at the second harmonic frequency with each pass of the fundamental beam through the SHG crystal;

the SHG crystal having a characteristic angle for propagation of the fundamental beam and second harmonic beam which achieves critical phase matching of the fundamental and second harmonic beams; and an optical transmission element oriented with respect to the SHG crystal to propagate the fundamental beam through the SHG crystal in four parallel optical passes and to propagate the fundamental beam and the second harmonic beam resulting from each pass in an optical path;

the optical transmission element propagating each pass of the fundamental beam and the second harmonic beam through the SHG crystal at the characteristic angle to achieve critical phase matching of the fundamental and the second harmonic beams;

the optical transmission element including a plurality of mirrors positioned in the optical path to reflect the fundamental beam to the SHG crystal in first, second, third and fourth passes of the fundamental beam through the SHG crystal and to reflect the second harmonic beam resulting from passing the fundamental beam through the SHG crystal coincidentally with the fundamental beam;

the optical transmission element also including a dichroic device oriented with respect to the SHG crystal to filter the second harmonic beam from the fundamental beam; and wherein:

the portion of the fundamental frequency beam converted to the second harmonic beam adds energy of the second harmonic beam with each pass of the fundamental beam through the SHG crystal.

2. A laser apparatus as defined in claim 1, wherein the dichroic device comprises a dichroic mirror positioned within the optical path.

3. A laser apparatus as defined in claim 2, wherein the dichroic mirror is positioned within the optical path to reflect the second harmonic beam after the fundamental beam has passed through the SHG crystal in at least four passes.

4. A laser apparatus as defined in claim 1, wherein the plurality of mirrors comprise:
a first mirror positioned within the optical path with the SHG crystal to receive from and reflect to the SHG crystal the fundamental beam and the second harmonic beam in the first and third passes of the fundamental beam through the SHG crystal, respectively;
a second mirror positioned within the optical path with the first mirror to receive from and reflect to the first mirror the fundamental beam and the second harmonic beam in the first and third passes of the fundamental beam through the SHG crystal, respectively, the second mirror also positioned within the optical path to reflect to and receive from the SHG crystal the fundamental beam and the second harmonic beam in the first and third passes of the fundamental beam through the SHG crystal, respectively; and
a third mirror positioned within the optical path with the SHG crystal to receive from and reflect to the SHG crystal the fundamental beam and the second harmonic beam in the second pass of the fundamental beam through the SHG crystal.

5. A laser apparatus as defined in claim 1, wherein:
the dichroic device diverts the second harmonic beam from the fundamental beam after the fundamental beam has passed through the SHG crystal in the four passes; and
the dichroic device is positioned in the optical path to receive from the SHG crystal the fundamental beam and the second harmonic beam after the fourth pass of the fundamental beam through the SHG crystal.

6. A laser apparatus as defined in claim 5, further comprising in combination:
a laser source which generates the fundamental beam; and wherein:
the dichroic mirror is positioned in the optical path to divert the fundamental beam from the second harmonic beam after the fourth pass of the fundamental beam through the SHG crystal to the laser.

7. A laser apparatus as defined in claim 1, further comprising:
a third harmonic generator (THG) crystal which converts the beams of light energy at the fundamental and second harmonic frequencies into a beam of light energy at a third harmonic frequency of the fundamental frequency with each pass of the fundamental and second harmonic beams through the THG crystal; and wherein:
the optical transmission element propagates the fundamental and second harmonic beams through the THG crystal in at least one pass and propagates the fundamental, second and third harmonic beams in the optical path.

8. A laser apparatus as defined in claim 7, wherein:
the first aforementioned dichroic device is a first dichroic device; and further comprising:
a second dichroic device positioned in the optical path to filter the third harmonic beam from the fundamental beam and the second harmonic beam.

9. A laser apparatus as defined in claim 7, wherein:
the optical transmission element propagates the fundamental, second, and third harmonic beams resulting from each pass in the optical path.

10. A laser apparatus as defined in claim 1, further comprising:
a fourth harmonic generator (FHG) crystal which converts the beam of light energy at the second harmonic frequency into a beam of light energy at a fourth harmonic frequency of the fundamental frequency with each pass of the second harmonic beam through the FHG crystal; and wherein:
the optical transmission element propagates the second harmonic beam through the FHG crystal in at least one pass and propagates the fundamental, second and fourth harmonic beams in the optical path.

11. A laser apparatus as defined in claim 10, wherein:
the first aforementioned dichroic device is a first dichroic device; and further comprising:
a second dichroic device in the optical path to divert the fourth harmonic laser beam from the second harmonic beam.

12. A laser apparatus as defined in claim 1, further comprising:
a third harmonic generator (THG) crystal which converts the beams of light energy at the fundamental and second harmonic frequencies into a beam of light energy at a third harmonic frequency of the fundamental frequency with each pass of the fundamental and second harmonic beams through the THG crystal; and wherein:
the optical transmission element propagates the fundamental and second harmonic beams through the THG crystal in at least one pass and propagates the fundamental, second and third harmonic beams resulting from each pass in the optical path.

13. A laser apparatus as defined in claim 1, further comprising:
a fourth harmonic generator (FHG) crystal which converts the beam of light energy at the second harmonic frequency into a beam of light energy at a fourth harmonic frequency of the fundamental frequency with each pass of the second harmonic beam through the FHG crystal; and wherein:
the optical transmission element propagates the second harmonic beam through the FHG crystal in at least one pass and propagates the second and fourth harmonic beams in the optical path.

14. A laser apparatus as defined in claim 1, further comprising in combination:
a laser source which generates the fundamental beam.

15. A method for generating a second harmonic laser beam from a fundamental laser beam in which the second harmonic beam has a frequency twice the frequency of the fundamental beam, comprising:
generating the second harmonic beam coincident with the fundamental beam by passing the fundamental beam through a second harmonic generator (SHG) crystal to convert light energy at the fundamental frequency into light energy in the second harmonic beam at the second harmonic frequency with each pass of the fundamental beam through the SHG crystal;
propagating the fundamental beam and the second harmonic beam through the SHG crystal in an optical path which extends through the SHG crystal at a characteristic angle which achieves critical phase matching of the fundamental and second harmonic beams;
increasing the light energy of the second harmonic beam above the light energy of the second harmonic beam obtained from the previous pass through the SHG crystal with each additional parallel pass of the fundamental beam through the SHG crystal;

using a plurality of mirrors to define the optical path through the SHG crystal;
passing the fundamental beam through the SHG crystal in at least four parallel passes; and
filtering the second harmonic beam from the optical path of the fundamental beam.

16. A method as defined in claim 15, further comprising:
filtering the second harmonic beam from the fundamental beam after the fundamental beam has passed through the SHG crystal in the four parallel passes.

17. A method as defined in claim 15, further comprising:
generating the fundamental beam from a laser source; and
diverting the fundamental beam remaining after the fourth parallel pass through the SHG crystal back to the laser source.

18. A method as defined in claim 15, further comprising:
generating a third harmonic beam by passing the fundamental beam and the second harmonic beam through a third harmonic generator (THG) crystal to convert light energy at the fundamental and second harmonic frequencies into light energy at a third harmonic frequency of the fundamental frequency with each pass of the fundamental and second harmonic beams through the THG crystal.

19. A method as defined in claim 18, further comprising:
filtering the third harmonic beam from the fundamental beam and the second harmonic beam.

20. A method as defined in claim 15, further comprising:
generating a fourth harmonic beam by passing the second harmonic beam through a fourth harmonic generator (FHG) crystal to convert light energy at the second harmonic frequency into light energy at a fourth harmonic frequency of the fundamental frequency with each pass of the second harmonic beam through the FHG crystal.

21. A method as defined in claim 20, further comprising:
filtering the fourth harmonic beam from the fundamental beam and the second harmonic beam.

* * * * *